United States Patent
Tu et al.

(10) Patent No.: US 8,953,673 B2
(45) Date of Patent: Feb. 10, 2015

(54) SCALABLE VIDEO CODING AND DECODING WITH SAMPLE BIT DEPTH AND CHROMA HIGH-PASS RESIDUAL LAYERS

(75) Inventors: Chengjie Tu, Sammamish, WA (US); Sridhar Srinivasan, Shanghai (CN); Shankar Regunathan, Bellevue, WA (US); Shijun Sun, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1270 days.

(21) Appl. No.: 12/074,030

(22) Filed: Feb. 29, 2008

(65) Prior Publication Data

US 2009/0219994 A1 Sep. 3, 2009

(51) Int. Cl.
- H04N 7/12 (2006.01)
- H04N 19/186 (2014.01)
- H04N 19/36 (2014.01)
- H04N 19/59 (2014.01)
- H04N 19/33 (2014.01)

(52) U.S. Cl.
CPC ... *H04N 19/00315* (2013.01); *H04N 19/00448* (2013.01); *H04N 19/00757* (2013.01); *H04N 19/00436* (2013.01)
USPC ............... 375/240.08; 375/240; 375/240.1; 375/240.12; 375/240.21; 375/240.26

(58) Field of Classification Search
None
See application file for complete search history.

(56) References Cited

U.S. PATENT DOCUMENTS

| | | | |
|---|---|---|---|
| 5,136,377 A | 8/1992 | Johnston et al. | |
| 5,300,949 A | 4/1994 | Rodriquez et al. | |
| 5,414,469 A | 5/1995 | Gonzales et al. | |
| 5,565,920 A | 10/1996 | Lee et al. | |
| 5,611,038 A | 3/1997 | Shaw et al. | |
| 5,764,296 A | 6/1998 | Shin | |

(Continued)

FOREIGN PATENT DOCUMENTS

| | | |
|---|---|---|
| CN | 1378384 | 11/2002 |
| CN | 1465193 | 12/2003 |

(Continued)

OTHER PUBLICATIONS

Ji et al., "Three-Dimensional Subband Scalable Video Coding Embedded with H.264/AVC/ Codec," *Proc of SPIE*, vol. 5960, pp. 201-209, 9 pages. http://research.microsoft.com/~fengwu/papers/base_vcip_05.PDF.

(Continued)

*Primary Examiner* — Jae Y Lee
*Assistant Examiner* — Aixa A Guadalupe Cruz
(74) *Attorney, Agent, or Firm* — Ladislav Kusnyer; Judy Yee; Micky Minhas

(57) ABSTRACT

Techniques and tools are described for scalable video encoding and decoding. In some embodiments, an input frame is downsampled in terms of sample depth and chroma sampling rate, encoded, and output from the encoder as a base layer bitstream. The base layer bitstream is also reconstructed and upsampled to produce a reconstructed bitstream which is subtracted from the original input frame to produce a residual layer. The residual layer is split and encoded as a sample depth residual layer bitstream and a chroma high-pass residual layer bitstream. To recover the encoded input frame, a decoder receives one or more of these bitstreams, decodes them, and combines them to form a reconstructed image. The use of separate codecs is allowed for the base layer and the enhancement layers, without inter-layer dependencies.

20 Claims, 6 Drawing Sheets

(56) References Cited

U.S. PATENT DOCUMENTS

| | | | |
|---|---|---|---|
| RE35,910 E | 9/1998 | Nagata et al. |
| 5,821,986 A | 10/1998 | Yuan et al. |
| 5,828,421 A | 10/1998 | Boyce et al. |
| 5,864,637 A | 1/1999 | Liu et al. |
| 5,970,173 A | 10/1999 | Lee et al. |
| 6,002,801 A | 12/1999 | Strongin et al. |
| 6,104,434 A | 8/2000 | Nakagawa et al. |
| 6,157,396 A | 12/2000 | Margulis et al. |
| 6,229,570 B1 | 5/2001 | Bugwadia et al. |
| 6,239,847 B1 | 5/2001 | Deierling |
| 6,259,741 B1 | 7/2001 | Chen et al. |
| 6,339,434 B1 | 1/2002 | West et al. |
| 6,418,166 B1 | 7/2002 | Wu et al. |
| 6,456,663 B1 | 9/2002 | Kim |
| 6,499,060 B1 | 12/2002 | Wang et al. |
| 6,501,484 B1 | 12/2002 | Porter |
| 6,510,177 B1 | 1/2003 | De Bonet et al. |
| 6,529,631 B1 | 3/2003 | Peterson et al. |
| 6,535,555 B1 | 3/2003 | Bordes et al. |
| 6,600,785 B1 | 7/2003 | Nishigori et al. |
| 6,678,424 B1 | 1/2004 | Ferguson |
| 6,700,933 B1 | 3/2004 | Wu et al. |
| 6,728,317 B1 | 4/2004 | Demos |
| 6,823,014 B2 | 11/2004 | Kim |
| 6,873,368 B1 | 3/2005 | Yu et al. |
| 6,937,291 B1 | 8/2005 | Gryskiewicz |
| 6,992,725 B2 | 1/2006 | Mohsenian |
| 6,993,078 B2 | 1/2006 | Hall et al. |
| 7,010,037 B2 | 3/2006 | Ye et al. |
| 7,072,525 B1 | 7/2006 | Covell |
| 7,154,952 B2 | 12/2006 | Tourapis et al. |
| 7,200,275 B2 | 4/2007 | Srinivasan et al. |
| 7,233,362 B2 | 6/2007 | Wu |
| 7,317,759 B1 | 1/2008 | Turaga et al. |
| 7,375,767 B2 | 5/2008 | Lee et al. |
| 7,570,834 B2 | 8/2009 | Deshpande |
| 7,653,133 B2 | 1/2010 | Woods et al. |
| 7,747,094 B2 | 6/2010 | Sekiguchi et al. |
| 7,956,930 B2 | 6/2011 | Sullivan |
| 2002/0037047 A1 | 3/2002 | Van Der Schaar et al. |
| 2002/0064226 A1 | 5/2002 | Bauer et al. |
| 2002/0159484 A1 | 10/2002 | Azizoglu et al. |
| 2002/0181583 A1 | 12/2002 | Corbera |
| 2002/0181586 A1 | 12/2002 | Kondo et al. |
| 2002/0186890 A1 | 12/2002 | Lee et al. |
| 2002/0186894 A1 | 12/2002 | Ferguson |
| 2003/0026339 A1 | 2/2003 | Presquet-Popescu et al. |
| 2003/0099298 A1 | 5/2003 | Rose et al. |
| 2003/0133500 A1 | 7/2003 | Auwera et al. |
| 2003/0161401 A1 | 8/2003 | Shen et al. |
| 2004/0013195 A1 | 1/2004 | Panusopone et al. |
| 2004/0042549 A1 | 3/2004 | Huang et al. |
| 2004/0101058 A1 | 5/2004 | Sasai et al. |
| 2004/0208247 A1 | 10/2004 | Barrau et al. |
| 2004/0213345 A1 | 10/2004 | Holcomb et al. |
| 2004/0264567 A1 | 12/2004 | Xu et al. |
| 2005/0018771 A1 | 1/2005 | Bourge et al. |
| 2005/0157791 A1 | 7/2005 | Sun |
| 2005/0195896 A1 | 9/2005 | Huang et al. |
| 2005/0195900 A1 | 9/2005 | Han |
| 2005/0259729 A1* | 11/2005 | Sun .................... 375/240.1 |
| 2005/0281333 A1 | 12/2005 | Ghanbari |
| 2006/0008006 A1 | 1/2006 | Cha et al. |
| 2006/0013305 A1 | 1/2006 | Sun |
| 2006/0072672 A1 | 4/2006 | Lin et al. |
| 2006/0072673 A1 | 4/2006 | Lin et al. |
| 2006/0083303 A1 | 4/2006 | Han et al. |
| 2006/0083308 A1 | 4/2006 | Schwarz et al. |
| 2006/0093036 A1 | 5/2006 | Park et al. |
| 2006/0133485 A1* | 6/2006 | Park et al. .............. 375/240.08 |
| 2006/0133503 A1 | 6/2006 | Park et al. |
| 2006/0146937 A1 | 7/2006 | Ye et al. |
| 2006/0153465 A1 | 7/2006 | Zhang et al. |
| 2006/0159173 A1 | 7/2006 | Ye et al. |
| 2006/0165302 A1 | 7/2006 | Han et al. |
| 2006/0193388 A1 | 8/2006 | Woods et al. |
| 2006/0262985 A1 | 11/2006 | Chen et al. |
| 2006/0268991 A1 | 11/2006 | Segall et al. |
| 2006/0285594 A1 | 12/2006 | Kim et al. |
| 2007/0014349 A1 | 1/2007 | Bao et al. |
| 2007/0053431 A1 | 3/2007 | Cammas et al. |
| 2007/0091997 A1 | 4/2007 | Fogg et al. |
| 2007/0121723 A1 | 5/2007 | Mathew et al. |
| 2007/0140354 A1 | 6/2007 | Sun |
| 2007/0153896 A1 | 7/2007 | Song et al. |
| 2007/0160126 A1 | 7/2007 | Van Der Meer et al. |
| 2007/0160153 A1 | 7/2007 | Sullivan |
| 2007/0171969 A1 | 7/2007 | Han et al. |
| 2007/0201551 A1* | 8/2007 | Wang et al. .................... 375/240.1 |
| 2007/0217500 A1 | 9/2007 | Gao et al. |
| 2007/0223579 A1 | 9/2007 | Bao |
| 2007/0223582 A1 | 9/2007 | Borer |
| 2007/0230575 A1 | 10/2007 | Han |
| 2007/0274396 A1 | 11/2007 | Zhang et al. |
| 2008/0008249 A1 | 1/2008 | Yan |
| 2008/0013630 A1 | 1/2008 | Li et al. |
| 2008/0024513 A1 | 1/2008 | Raveendran |
| 2008/0084930 A1 | 4/2008 | Sekiguchi et al. |
| 2008/0089417 A1 | 4/2008 | Bao et al. |
| 2008/0095235 A1 | 4/2008 | Hsiang |
| 2008/0123947 A1 | 5/2008 | Moriya et al. |
| 2008/0152000 A1 | 6/2008 | Kaushik |
| 2008/0165848 A1 | 7/2008 | Ye et al. |
| 2008/0267289 A1 | 10/2008 | Yu et al. |
| 2008/0304567 A1 | 12/2008 | Boyce et al. |
| 2009/0003718 A1 | 1/2009 | Liu et al. |
| 2009/0060034 A1 | 3/2009 | Park et al. |
| 2009/0060050 A1 | 3/2009 | Park et al. |
| 2009/0207912 A1 | 8/2009 | Holcomb et al. |
| 2009/0219994 A1 | 9/2009 | Tu et al. |
| 2009/0252425 A1 | 10/2009 | Bruls et al. |
| 2009/0262798 A1 | 10/2009 | Chiu et al. |
| 2009/0268818 A1 | 10/2009 | Lu et al. |
| 2010/0142615 A1 | 6/2010 | Han |

FOREIGN PATENT DOCUMENTS

| | | |
|---|---|---|
| CN | 1722838 | 1/2006 |
| CN | 1728833 | 2/2006 |
| CN | 101040533 | 9/2007 |
| EP | 1 401 211 | 3/2004 |
| EP | 1 617 677 | 1/2006 |
| JP | 4-207684 | 7/1992 |
| JP | 2000-506687 | 5/2000 |
| JP | 2000-165661 | 6/2000 |
| JP | 2000-165866 | 6/2000 |
| JP | 2000-242774 | 9/2000 |
| JP | 2001-197527 | 7/2001 |
| JP | 2002-152498 | 5/2002 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-035029 | 2/2008 |
| KR | 20020081777 | 10/2002 |
| RU | 2191469 | 10/2002 |
| SU | 1506554 | 9/1989 |
| WO | WO 98/41029 | 9/1998 |
| WO | WO 99/09748 | 2/1999 |
| WO | WO 00/33581 | 6/2000 |
| WO | WO 00/74385 | 12/2000 |
| WO | WO 01/95633 | 12/2001 |
| WO | WO 02/01881 | 1/2002 |
| WO | WO 02/50772 | 6/2002 |
| WO | WO 02/054777 | 7/2002 |
| WO | WO 02/085026 | 10/2002 |
| WO | WO 02/096120 | 11/2002 |
| WO | WO 03/007619 | 1/2003 |
| WO | WO 03/061294 | 7/2003 |
| WO | WO 03/107683 | 12/2003 |
| WO | WO 2004/008771 | 1/2004 |
| WO | WO 2004/036919 | 4/2004 |
| WO | WO 2006/006777 | 1/2006 |

(56) References Cited

FOREIGN PATENT DOCUMENTS

| WO | WO 2006/079997 | | 8/2006 |
|---|---|---|---|
| WO | WO 2006/112620 | | 10/2006 |
| WO | WO 2006/125713 | A2 | 11/2006 |
| WO | WO 2007/008286 | | 1/2007 |
| WO | WO 2007/009875 | | 1/2007 |
| WO | WO 2007/018669 | | 2/2007 |
| WO | WO 2007/042365 | | 4/2007 |
| WO | WO 2007/114617 | | 10/2007 |
| WO | WO 2008/004816 | | 1/2008 |
| WO | WO2008049446 | * | 5/2008 |

OTHER PUBLICATIONS

Kirenko et al., "Modification of 3d Wavelet Scalable Video Coding" Philips Research Laboratories, The Netherlands, 6 pages. http://wwww.ece.ucdavis.edu/PCS2004/pdf/ID40_PCS_paper_final.pdf
Schwarz et al., "Overview of the Scalable Video Coding Extension of the H.264/AVC Standard," IEEE Transactions on Circuits and Systems for Video Technology (Sep. 2007) 18 pages. http://iphome.hhi.de/marpe/download/ieee-7_svc_overview.pdf.
Catmull et al., "A Class of Local Interpolating Splines," Computer Aided Geometric Design, Academic Press, pp. 317-326 (Mar. 1974).
Chen et al., "Frame Loss Error Concealment for SVC," J Zhejiang Univ. Science A, vol. 7(5): 677-683 (2006), 7 pages. http://www.zju.edu.cn/jzus/2006/A0605/A06050.pdf.
"DivX Multi Standard Video Encoder," 2 pp. (Downloaded from the World Wide Web on Jan. 24, 2006).
Han et al., "Robust and Efficient Scalable Video Coding with Leaky Prediction," Information Systems Laboratory, Stanford University, pp. II-41 through II-44; 5 pages. http://66.102.1.104/scholar?hl=en&lr=&q=cache:fp7Qa34oceJ:viola.usc.edu/paper/icip2002/pdfs/2433.pdf.
ISO/IEC, "ISO/IEC 11172-2: Information Technology—Coding of Moving Pictures and Associated Audio for Storage Media at up to About 1.5 Mbit/s," 122 pp. (Aug. 1993).
ISO/IEC 14496-10, Joint Video Team (JVT) of ISO/IEC MPEG & ITU-T VCEG, Joint Draft 6, Apr. 2006, 527 pgs.
ISO/IEC, "Information Technology—Coding of Audio-Visual Objects: Visual, ISO/IEC 14496-2, Committee Draft," 330 pp. (Mar. 1998).
ITU, Recommendation H.261, "Line Transmission of Non-Telephone Signals," 28 pp. (Mar. 1993).
ITU-T, "ITU-T Recommendation H.262: Information Technology—Generic Coding of Moving Pictures and Associated Audio Information: Video," 218 pp. (Jul. 1995).
ITU-T, "ITU-T Recommendation H.263: Video Coding for Low Bit Rate Communication," 167 pp. (Feb. 1998).
ITU, "ITU-T Recommendation H.264: Advanced Video Coding for generic audiovisual services," 281 pp. (May 2003).
Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).
Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).
Keys, "Cubic Convolution Interpolation for Digital Image Processing," Computer Graphics, vol. ASSP-29, No. 6, pp. 1153-1160 (Dec. 1981).
Mitchell et al., "Reconstruction Filters in Computer Graphics," Computer Graphics, vol. 22, No. 4 pp. 221-228 (Aug. 1988).
Reader, "History of MPEG Video Compression—Ver. 4.0," 99 pp. (document marked Dec. 16, 2003).
Schwarz et al., "Overview of the Scalable H.264/Mpeg4-AVC Extension," Fraunhofer Institute for Telecommunications—Heinrich Hertz Institute, Image Processing Dept., 4 pages. http://iphome.hhi.de/marpe/download/icip06_svc.pdf.
Segall, "Study of Upsampling/Downsampling for Spatial Scalability," JVT-Q083, Nice, France, 18 pp. (Oct. 2005).
Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).
Sullivan, "Position Calculation for SVC Upsampling," JVT-R067, Bangkok, Thailand, 7 pp. (Jan. 2006).
Sullivan et al., "Position Calculation for SVC Upsampling," JVT-S067, Geneva, Switzerland, 12 pp. (Mar. 2006).
Sullivan, "Position Calculation for SVC Upsampling," JVT-U067, Hangzhou, China, 7 pp. (Oct. 2006).
Sun et al., "Unified Solution for Spatial Scalability," JVT-R018, Bangkok, Thailand, 6 pp. (Jan. 2006).
Wang et al., "WZS: Wyner-Ziv Scalable Predictive Video Coding," Integrated Media Systems Center and Department of Electrical Engineering, University of Southern California, 6 pages. http://www.ece.ucdavis.edu/PCS2004/pdf/ID110_pcs04/pdf.
Abhayaratne, "2D Wavelet Transforms with a Spatially Adaptive 2D Low Pass Filter," *Signal Processing Symp.*, pp. 93-96 (Jun. 2004).
Abhayaratne, "Spatially Adaptive Integer Lifting with No Side Information for Lossless Video Coding," *Picture Coding Symp.*, 6 pp. (Apr. 2003).
Andreopoulos et al., "A New Method for Complete-to-Overcomplete Discrete Wavelet Transforms," *Proc. IEEE Conf. Digital Signal Proc.*, 4 pp. (Jul. 2002).
Andreopoulos et al., "Complete-to-Overcomplete Discrete Wavelet Transforms for Scalable Video Coding with MCTF," *Proc. SPIE Visual Communications and Image Processing*, pp. 719-731 (Jul. 2003).
Andreopoulos et al., "Fully-Scalable Wavelet Video Coding Using In-Band Motion Compensated Temporal Filtering," *IEEE International Conference on Acoustics, Speech, and Signal Processing. IEEE*, 4 pp. (Apr. 2003).
Andreopoulos et al., "Wavelet-Based Fully-Scalable Video Coding With In-Band Prediction," *Proc. 3rd IEEE Benelux Signal Processing Symposium* (SPS-2002), pp. S02 1 to S02-4 (Mar. 2002).
Anonymous, "Video Subgroup Schedule, 68th MPEG Meeting," 6 pp. (Mar. 2004).
Bjontegaard et al., "H.263 Anchors—Technical Description," MPEG95/0322 (1995).
Brainard et al., "Composite Television Coding: Subsampling and Interpolation," SMPTE Journal, pp. 717-724 (Aug. 1982).
Chang et al., "A Scalable Video Compression Technique Based on Wavelet Transform and MPEG Coding" *IEEE Trans. on Consumer Electronics*, vol. 45, No. 3, pp. 788-793 (Aug. 1999).
Chen et al., "Adaptive Joint Source-Channel Coding using Rate Shaping," *ICASSP*, 4 pp. (May 2002).
Chen et al., "Bidirectional MC-EZBC with Lifting Implementation," 26 pp. (document marked May 2003).
Chen et al., "Improved MC-EZBC with Quarter-pixel Motion Vectors," ISO/IEC JTC1/SC29/WG11, MPEG2002/m8366, Fairfax (2002).
Chen et al., "Improvements to the MC-EZBC Scalable Video Coder," ICIP 2003, vol. 2, pp. 14-17 (Sep. 2003).
Choi et al., "Motion-compensated 3-D subband coding of video," *IEEE Trans. on Image Processing*, vol. 8, No. 2, pp. 155-167 (Feb. 1999).
Chooi et al., "3D Subband Coder for Very Low Bit Rates" *IEEE*, pp. 405-408 (Apr. 1994).
Dufaux et al., "Abstract: Motion-compensated generic coding of video based on a multi resolution data structure," 2 pp. (1993) [downloaded from the World Wide Web on Jan. 25, 2006].
Einarsson et al., "Mixed Resolution Video Coding for Low Bit-Rate Channels," *Proc. Int'l Workshop on Coding Techniques for Very Low Bit-Rate Video: VLBV97*, Linköping, Sweden, pp. 77-80 (Jul. 1997).
Gharavi et al., "Video Coding and Distribution over ATM for Multipoint Teleconferencing," GLOBECOM '93, 7 pp. (1993).
ISO/IEC JTC1/SC29/WG11 MPEG2003/N6193, "Call for Proposals on Scalable Video Coding Technology," 12 pp. (Dec. 2003).
ISO/IEC JTC1/SC29/WG11 MPEG2004/W6383, "Subjective test results for the CfP on Scalable Video Coding Technology," 17 pp. (Mar. 2004).
ISO/IEC JTC1/SC29/WG11 MPEG2004/M11126, "Spatial Scalability in 3D Wavelet Coding with Spatial Domain MCTF Encoder," 14 pp. (Jul. 2004).

(56) References Cited

OTHER PUBLICATIONS

Iwahashi et al., "A Motion Compensation Technique for Downscaled Pictures in Layered Coding," *IEICE Transactions on Comm.*, vol. E77-B, No. 8, pp. 1007-1012 (Aug. 1994).
Ji et al., "Architectures of Incorporating MPEG-4 AVC into Three-Dimensional Wavelet Video Coding," *Picture Coding Symposium 2004*, 6 pp. (Dec. 2004).
Joint Video Team (JVT) of ISO/IEC MPEG & ITU-T VCEG, "Joint Final Committee Draft (JFCD) of Joint Video Specification," JVT-D157, 207 pp. (Aug. 2002).
Karlsson et al., "Subband Coding of Video for Packet Networks" *Optical Engineering*, vol. 27, No. 7, pp. 574-586 (Jul. 1988).
Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).
Li et al., "All-phase Motion Compensated Prediction for High Performance Video Coding," Proc. ICIP, vol. 3, pp. 538-541 (2001).
Luo et al., "Advanced Lifting-based Motion Threading (MTh) Technique for the 3D Wavelet Video Coding," *Proceedings of the SPIE/IEEE Visual Communications and Image Processing (VCIP2003)*, vol. 5150, pp. 707-718 (Jun. 2003).
Luo et al., "Motion Compensated Lifting Wavelet and Its Application in Video Coding," *Proceedings of the IEEE Int. Conf. on Multimedia and Expo*, 4 pp. (Aug. 2001).
Mehrseresht et al., "Adaptively Weighted Update Steps in Motion Compensated Lifting Based on Scalable Video Compression," Proceedings of the IEEE Int. Conf. on Image Processing, vol. 2, 4 pp. (Sep. 2003).
Netravali et al., "Adaptive Quantization of Picture Signals Using Spatial Masking," *Proc. IEEE*, vol. 65, pp. 536-548 (1977).
Ohm, "Three Dimensional Subband Coding with Motion Compensation," *IEEE Trans. on Image Processing*, vol. 3, No. 5, pp. 559-571 (Sep. 1994).
Pesquet-Popescu et al., "Three-dimensional Lifting Schemes for Motion Compensated Video Compression," ICASSP, vol. 3, 4 pp. (2001).
Piella et al., "An Adaptive Update Lifting Scheme with Perfect Reconstruction," *IEEE Int'l Conf. on Image Processing*, vol. 3, pp. 190-193 (Oct. 2001).
Printouts of FTP directories from http://ftp3.itu.ch, 8 pp. (downloaded from the World Wide Web on Sep. 20, 2005).
Santa Cruz, "JVT-O061-CE9verif.doc," 2 pp. (downloaded from the World Wide Web on May 10, 2005.).
Sebe et al., "An Overcomplete Discrete Wavelet Transform for Video Compression," *IEEE Int'l Conf. on Multimedia and Expo*, 4 pp. (Nov. 2002).
Secker et al., "Highly Scalable Video Compression Using a Lifting-based 3D Wavelet Transform with Deformable Mesh Motion Compensation," *IEEE Int'l Conf. on Image Processing*, vol. 3, 4 pp. (Jun. 2002).
Secker et al., "Lifting-based Invertible Motion Adaptive Transform (LIMAT) Framework for Highly Scalable Video Compression," *IEEE Trans. Image Processing*, vol. 12, 35 pp. (Dec. 2003).
Song et al., "Content Adaptive Update Steps for Lifting-Based Motion Compensated Temporal Filtering," *Picture Coding Symposium*, 5 pp. (Dec. 2004).
Sullivan, "Color Format Upconversion for Video Display," JVT-I019r2, San Diego, 6 pp. (Sep. 2003).
Sullivan, "Resampling Filters for SVC Upsampling," JVT-R066, Bangkok, Thailand, 9 pp. (Jan. 2006).
Sun et al., "Seamless Switching of Scalable Video Bitstreams for Efficient Streaming," *IEEE Transactions on Multimedia*, vol. 6, No. 2, pp. 291-303 (Apr. 2004).
Tomasi et al., "Bilateral Filtering for Gray and Color Images," *IEEE Int'l Conf. on Computer Vision*, 8 pp. (Jan. 1998).
Turaga et al., "Content-adaptive filtering in the UMCTF framework," *IEEE Proc. Int'l Conf. on Acoustics, Speech and Signal Processing*, vol. 3, pp. 621-624 (Apr. 2003).
Video Compression 1: H 261—Multimedia Systems (Module 4 Lesson 2), 5 pp. (document not dated).
Voloshynovskiy et al., "A Stochastic Approach to Content Adaptive Digital Image Watermarking," 26 pp. (Sep. 1999).
Wang et al., "Adaptive Image Matching in the Subband Domain," *Proc. SPIE*, 12 pp. (Dec. 2004).
Wien, "Variable Block-Size Transforms for Hybrid Video Coding," Dissertation, 182 pp. (Feb. 2004).
Wu et al., "Bit-depth scalability compatible to H.264/AVC-scalable extension," *J. Vis. Commun. Image R.*, vol. 19, pp. 372-381 (Jun. 2008).
Wu et al., "SMART: An Efficient, Scalable and Robust Streaming Video System," *EURASIP on Applied Signal Processing*, vol. 2, 39 pp. (Feb. 2004).
Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).
Xiong et al., "Spatial Scalability in 3D Wavelet Coding with Spatial Domain MCTF Encoder," *Picture Coding Symposium*, 6 pp. (Dec. 2004).
Xu et al., "3D Sub-band Video Coding Using Barbell Lifting," MPEG2004/M10569/S05, 14 pp. (downloaded from the World Wide Web on May 10, 2005.).
Xu et al., "Three-Dimensional Embedded Subband Coding with Optimal Truncation (3D ESCOT," *Applied and Computational Harmonic Analysis*, pp. 290-315 (May 2001).
Yang et al., "A Novel Adaptive De-Interlacing Algorithm Based on Motion Compensation," *Microelectronics and Computer*, Issue 9, pp. 4-6 (Sep. 30, 2002).
Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).
Zhao et al., "Macroblock Skip-Mode Prediction for Complexity Control of Video Encoders," *IEEE Int'l Conf. on Visual Information Engineering*, 4 pp. (Jul. 2003).
Kim et al., "Low Bit-Rate Scalable Video Coding with 3-D Set Partitioning in Hierarchical Trees (3-D SPIHT)," *IEEE Trans. on Circuits and Systems for Video Technology*, vol. 10, No. 8, pp. 1374-1387 (Dec. 2000).
Niu et al., "MPEG-4 Video Encoder Based on DSP-FPGA Techniques," *IEEE Int'l Conf. on Communications, Circuits and Systems*, vol. 1, pp. 518-522 (May 2005).
Sun, "Resampling Process for Interlaced Materials in SVC," JVT-Rxxx, Meeting: Bangkok, Thailand, 9 pp. (Jan. 2006).

\* cited by examiner

SCALABLE VIDEO CODING AND DECODING WITH SAMPLE BIT DEPTH AND CHROMA HIGH-PASS RESIDUAL LAYERS

BACKGROUND

Engineers use compression (also called coding or encoding) to reduce the bit rate of digital video. Compression decreases the cost of storing and transmitting video by converting the video into a lower bit rate form. Decompression (also called decoding) reconstructs a version of the original video from the compressed form. A "codec" is an encoder/decoder system.

Most scalable video codecs split video into a base layer and an enhancement layer. The base layer alone provides a reconstruction of the video at a lower resolution, and the enhancement layer can be added to provide extra information that will increase the video quality. Some scalable codecs rely on temporal scalability of video. For example, certain frames of video are encoded by the encoder, but the decoder does not reconstruct those frames. Other common scalable encoding schemes involve scalability for either the spatial resolution or the signal-to-noise ratio ("SNR") of the video.

In many prior art systems, an enhancement layer codec depends on the base layer to provide a certain amount of information necessary to encode or decode the enhancement layer. For example, the enhancement layer coding is based upon base layer coding information such as motion vectors and DCT coefficients used to encode the base layer frame. As a result, the enhancement layer codec is coupled with the given base layer codec being used so the enhancement layer codec can use the same macroblocks and motion vectors as the base layer codec. Thus, a base layer encoded according to one standard would require a different enhancement layer codec than a base layer encoded according to another standard. This multiplicity of enhancement layer codecs can lead to a very high cost of developing, testing, and deploying the enhancement layer codecs.

Scalable video codecs that support temporal scalability, spatial scalability and/or SNR scalability provide many options for base and enhancement layers. While these types of scalability provide acceptable performance in many scenarios, they do not have the benefits and advantages of the techniques and tools described below.

SUMMARY

In summary, the detailed description presents techniques and tools for scalable encoding and decoding of video using a chroma high-pass residual layer and/or a sample depth residual layer. For example, the techniques and tools improve the performance of a general-purpose video encoder when it encodes a base layer and an enhancement layer of video pictures, particularly when the two layers are at different bit depths, thereby improving quality and/or reducing development time and cost for introducing new codecs.

In some embodiments, a tool such as a video encoder encodes a base layer for video to produce a base layer bitstream. The tool also encodes a chroma high-pass residual layer for the video to produce a chroma enhancement layer bitstream, and encodes a sample depth residual layer to produce a sample depth enhancement layer bitstream. The tool can uses the same type of encoder for the base layer and enhancement layers, or different types of encoders. Finally, the tool outputs the base layer bitstream and the two residual layer bitstreams.

In some cases, the chroma high-pass residual layer and the sample depth residual layer are produced by reconstructing the base layer from the base layer bitstream (which includes corresponding upsampling when the base layer was downsampled to a lower sample depth and chroma sampling rate), subtracting the reconstructed base layer from the original base layer to produce a residual, and decomposing the residual. The decomposing uses wavelet decomposition, for example, to separate the chroma high-pass residual layer and sample depth residual layer.

In other embodiments, a tool such as a video decoder receives a base layer bitstream and a chroma enhancement layer bitstream. The tool decodes the base layer bitstream to produce a base layer for video, and decodes the chroma enhancement layer bitstream to produce a chroma high-pass residual layer for the video. The tool combines the base layer and the chroma high-pass residual layer for the video.

In other embodiments, a tool such as a video decoder receives a base layer bitstream and a sample depth enhancement layer bitstream. The tool decodes the base layer bitstream to produce a base layer for video, and decodes the sample depth enhancement layer bitstream to produce a sample depth residual layer for the video. The tool combines the base layer for the video and the sample depth residual layer for the video.

The foregoing and other objects, features, and advantages will become more apparent from the following detailed description, which proceeds with reference to the accompanying figures. This summary is provided to introduce a selection of concepts in a simplified form that are further described below in the detailed description. This summary is not intended to identify key features or essential features of the claimed subject matter, nor is it intended to be used to limit the scope of the claimed subject matter.

DETAILED DESCRIPTION

Figure 1:
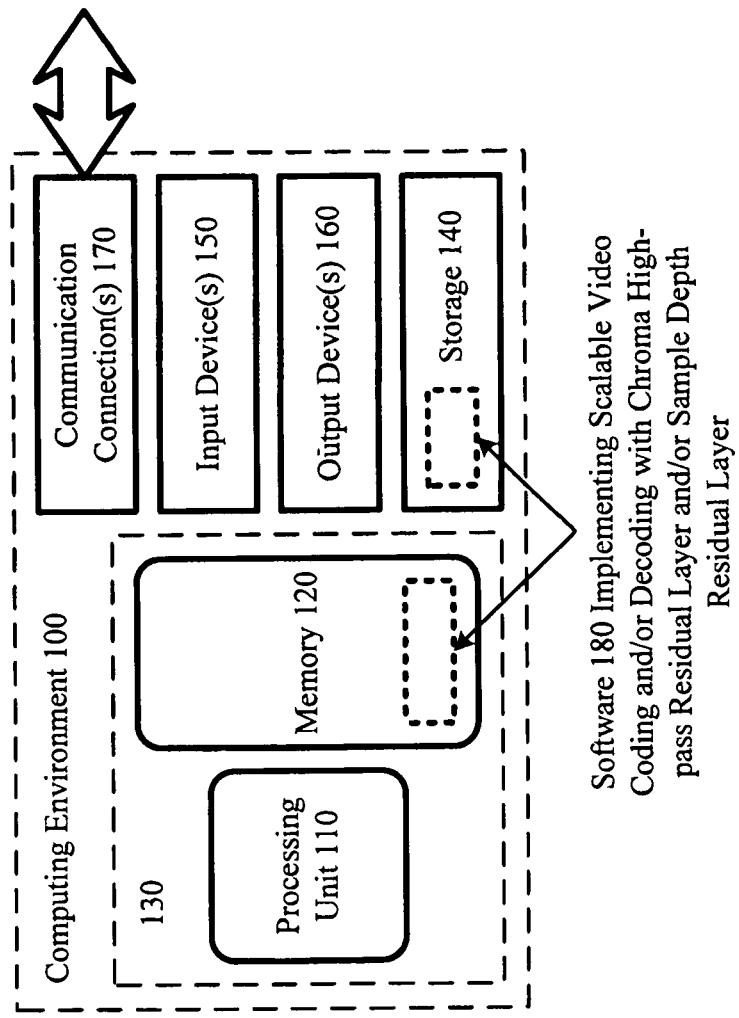
FIG. 1 is a block diagram of a suitable computing environment in which several described embodiments may be implemented.

When video is encoded, common source formats are YUV or YCbCr, where Y is the brightness (Luma) component and the other two components such as U and V or Cb and Cr are the color (Chroma) components. The human eye is more sensitive to variations in brightness than color, so encoders have been developed to take advantage of this fact. In the YUV color space, one chroma sampling rate is 4:4:4 which indicates that for every luma sample, a corresponding U sample and a V sample are present. Another chroma sampling rate is 4:2:2, which indicates that a single U sample and a single V sample correspond to two horizontal luma samples. Chroma sampling rates at lower resolution, such as 4:2:2 or 4:2:0, result in fewer samples and typically require fewer bits to encode than higher resolution chroma sample rates, such as 4:4:4. Because of the prevalence of 4:2:0 chroma sampling, certain encoders accept video in 4:2:0 format, but not source formats with higher chroma resolution.

Each picture element ("pixel") of a video picture includes one or more samples, and each sample is digitally represented with one or more bits. Studios and content producers often use video with 10 bits per sample or 12 bits per sample. Using higher bit depth allows for greater precision in sample values. For example, 12-bit sample values have more possible values than 10-bit sample values or 8-bit sample values. Many encoders accept video with 8-bit samples, however, according to convention.

The present application relates to techniques and tools for efficiently encoding and decoding the enhancement layer(s) and the base layer of video. For example, the video can be scaled to a different chroma resolution or sample bit depth at one or more points in the encoding or decoding process. This scalability is achieved by introducing two novel scalability methods, specifically chroma scalability and sample depth scalability. These provide useful scalability options on their own or in conjunction with temporal, spatial or SNR scalability. In some cases, implementation is simplified by separating the enhancement layer codec from the base layer codec—the enhancement layer is encoded using the output frame of the base layer codec instead of relying on base layer coding information such as the motion vectors and DCT coefficients used to encode the base layer output frame.

One way to accomplish these goals is to downsample the video before the base layer is encoded, and then encode the base layer according to the VC-1 standard, H.264 standard, MPEG-2 standard or another encoding approach. The bitstream is then decoded to produce reconstructed video, which can be upsampled to the original resolution. The residual layer is determined by subtracting the upsampled reconstructed video from the original video. At this point the residual layer can be downsampled, split, or both. The one or more residual layers are separately encoded and output as enhancement layer bitstream(s).

Various alternatives to the implementations described herein are possible. Certain techniques described with reference to flowchart diagrams can be altered by changing the ordering of stages shown in the flowcharts, by splitting, repeating or omitting certain stages, etc. The various techniques and tools described herein can be used in combination or independently. Different embodiments implement one or more of the described techniques and tools.

Some of the techniques and tools described herein address one or more of the problems noted in the background. Typically, a given technique/tool does not solve all such problems. Rather, in view of constraints and tradeoffs in encoding time, encoding resources, decoding time, decoding resources, available bit rate, and/or quality, the given technique/tool improves performance for a particular implementation or scenario.

I. Computing Environment.

FIG. 1 illustrates a generalized example of a suitable computing environment (100) in which several of the described embodiments may be implemented. The computing environment (100) is not intended to suggest any limitation as to scope of use or functionality, as the techniques and tools may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory, etc.), or some combination of the two. The memory (120) stores software (180) implementing an encoder with one or more of the described techniques and tools for scalable video coding and/or decoding using chroma high-pass residuals and/or sample depth residuals.

A computing environment may have additional features. For example, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and includes magnetic disks, magnetic tapes or cassettes, CD-ROMs, DVDs, or any other medium which can be used to store information and which can be accessed within the computing environment (100). The storage (140) stores instructions for the software (180) implementing the video encoder and/or decoder.

The input device(s) (150) may be a touch input device such as a keyboard, mouse, pen, or trackball, a voice input device, a scanning device, or another device that provides input to the computing environment (100). For audio or video encoding, the input device(s) (150) may be a sound card, video card, TV tuner card, or similar device that accepts audio or video input in analog or digital form, or a CD-ROM or CD-RW that reads audio or video samples into the computing environment (100). The output device(s) (160) may be a display, printer, speaker, CD-writer, or another device that provides output from the computing environment (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment (100), computer-readable media include memory (120), storage (140), communication media, and combinations of any of the above.

The techniques and tools can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "produce" and "reconstruct" to describe computer operations in a computing environment. These terms are high-level abstractions for operations performed by a computer, and should not be confused with acts performed by a human being. The actual computer operations corresponding to these terms vary depending on implementation.

II. Scalable Chroma Sub-Sampling and Sample Depth in Encoding.

A. Generalized Techniques.

Figure 2:
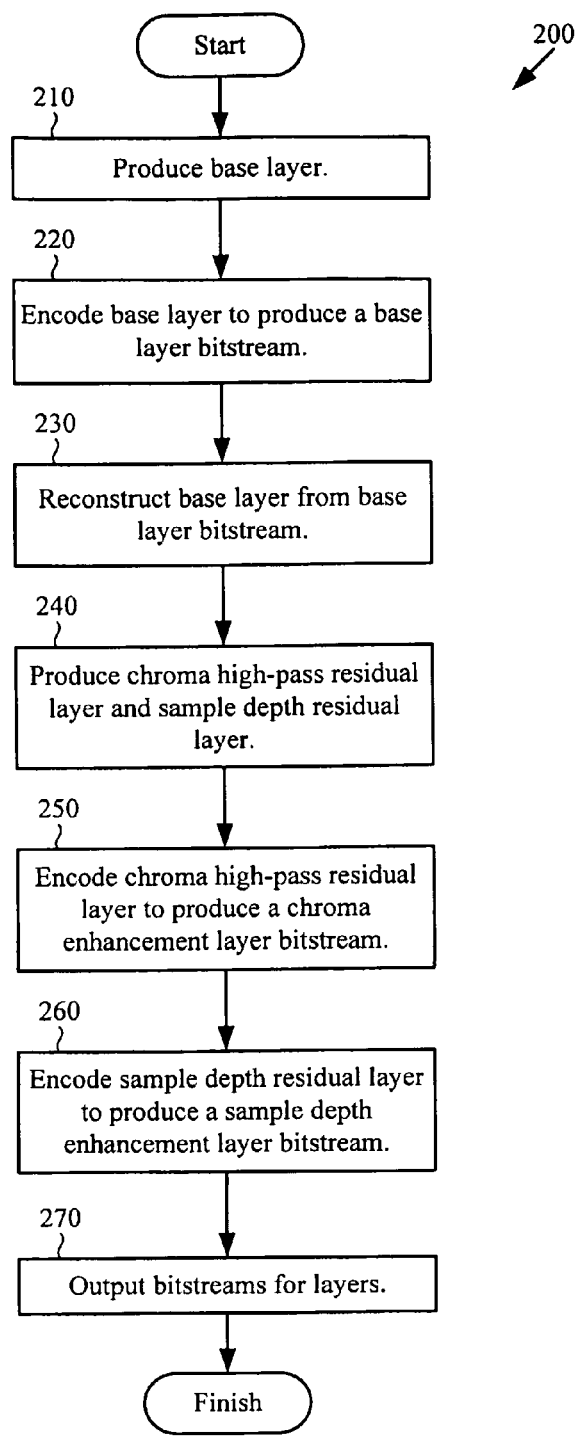
FIG. 2 is a flow chart of a generalized technique for encoding video using a high-pass chroma residual layer and a sample depth residual layer.

FIG. 2 shows a flow chart of a generalized technique for encoding video using a chroma high-pass residual and sample depth residual. Generally, the encoding tool accepts a video picture and, at the first step, produces (210) a base layer. In some cases, the input video picture has 10-bit samples and a chroma sampling rate of 4:2:2. In other cases, the input video is in a 8-bit 4:2:0 format, in a 8-bit 4:4:4 format, or in a format with another combination of bit depth and chroma sampling rate. This base layer may be produced by downsampling either the bit depth, the chroma sampling rate, or both, of the picture. For example, a picture that is originally in 10-bit 4:2:2 format may be downsampled to 8-bit 4:2:0 format using sample bit-depth downsampling and chroma downsampling. This can be done to facilitate encoding with a particular base layer encoder or to facilitate decoding by devices with different capabilities.

The tool encodes (220) the base layer to produce a base layer bitstream. The tool uses an H.264 encoder, a VC-1 encoder, an MPEG-2 encoder or other encoder for base layer encoding. The tool reconstructs (230) the base layer from the base layer bitstream, and uses this reconstructed base layer to produce (240) a chroma high-pass residual and sample depth residual. For example, the tool computes the sample-by-sample difference between the input video and the reconstructed base layer. If the base layer was downsampled to a lower bit depth or chroma sampling rate, then the reconstructed base layer is correspondingly upsampled to the original bit depth or chroma sampling rate before this residual is produced. The residual is decomposed to form a chroma high-pass residual layer and a sample depth residual layer. In one embodiment, the decomposition is accomplished by wavelet decomposition, though other embodiments use other commonly known forms of decomposition.

The tool encodes (250) the chroma high-pass residual layer to produce a chroma enhancement layer bitstream. The tool encodes (260) the sample depth residual layer to produce a sample depth enhancement layer bitstream. The chroma high-pass residual layer or sample depth residual layer may be encoded with the same type of encoding (e.g., with the same encoding software, or producing a bitstream compliant with the same standard) as used for the base layer, or with a different type of encoding. Similarly, the residual layers may each be encoded with the same type of encoding or different types of encoding. Finally, the tool outputs (270) the base layer bitstream, the chroma enhancement layer bitstream, and the sample depth enhancement layer bitstream.

In some embodiments, the tool produces a sample depth residual layer but does not produce a chroma high-pass residual layer. In other embodiments, the tool produces a chroma high-pass residual layer but does not produce a sample depth residual layer. As will be explained in greater detail below, these steps may be determined by the bit depth and chroma sampling rate of the input video, the requirements of the encoder, and/or the capabilities of expected decoders.

B. Example Encoding Tools.

Figure 3:
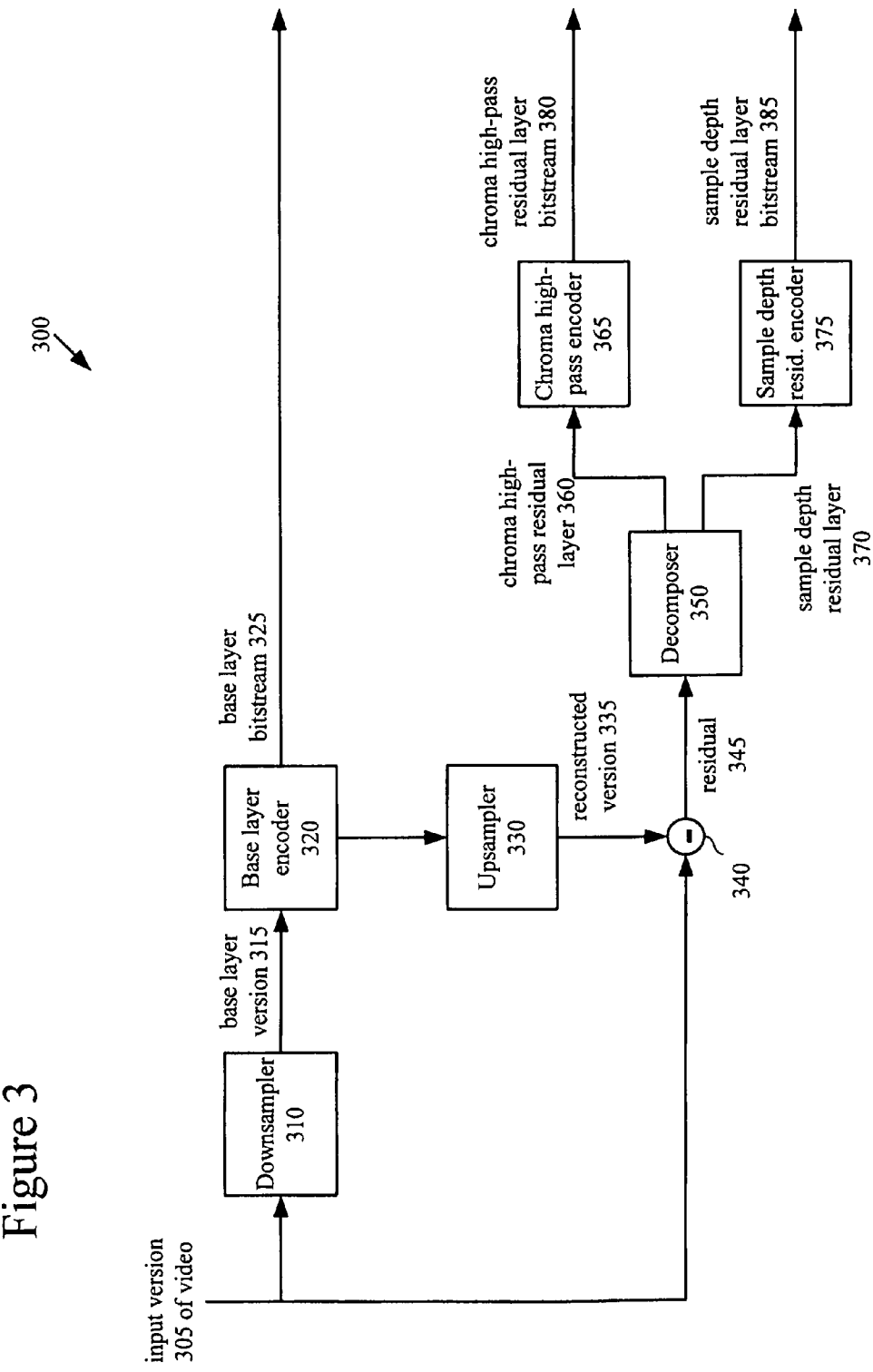
FIG. 3 is a block diagram of a video encoder system for encoding with scalable chroma sub-sampling and scalable sample depth.

FIG. 3 is a block diagram of a generalized video encoding system (300) in conjunction with which some described embodiments may be implemented. The system (300) receives a sequence of video pictures including an input picture (305) and produces a base layer bitstream (325), and one or more of a chroma high-pass residual layer bitstream (365) and a sample depth residual layer bitstream (375). For the base layer, the format of the output bitstream can be a Windows Media Video or VC-1 format, MPEG-x format (e.g., MPEG-1, MPEG-2, or MPEG-4), H.26x format (e.g., H.261, H.262, H.263, or H.264), or other format. For the residual layer(s), the format of the output bitstream(s) can be the same as the base layer bitstream or one of the other listed formats (after appropriate mapping to an acceptable input format, if needed).

The system (300) processes video pictures. The term picture generally refers to source, coded or reconstructed image data. For progressive video, a picture is a progressive video frame. For interlaced video, a picture may refer to an interlaced video frame, the top field of the frame, or the bottom field of the frame, depending on the context.

An input picture (305) is input to the system (300). The input picture (305) has a bit depth or a chroma sampling rate that is at a higher resolution than the base layer encoder (320) accepts. For example, the base layer encoder (320) may be configured to encode video pictures with 8-bit samples and a 4:2:0 chroma sampling rate, and the input picture (305) has 10-bit samples and a 4:2:2 chroma sampling rate, or has another format with higher resolution than 8-bit 4:2:0. The system (300) includes a downsampler (310) operable to decrease the bit depth and/or the chroma sampling rate of the input picture (305) to produce a base layer version (315). For sample depth downsampling, the downsampler (310) can clip the least significant x bits of a sample, use tone mapping to map sample values in one bit depth (e.g., 10 bits per sample) to another bit depth (e.g., 8 bits per sample), or use another mechanism. For chroma sub-sampling, the downsampler (310) can use sample dropping, low-pass filtering, or another mechanism. The downsampler (310) may also be operable to change other parameters of the input picture (305) such as the spatial resolution. For example if the input picture (305) is in CIF resolution, then the base layer version (315) could be QCIF.

The base layer version (315) is encoded by a base layer encoder (320). This produces a base layer bitstream (325) in VC-1, MPEG-x, H.26x, or some other video format.

As part of encoding, the base layer encoder (320) produces a reconstructed version (335) of the input picture (305). For example, the base layer encoder (320) decodes and buffers a reconstructed base layer frame for use in later motion compensation. The reconstructed version (335) is thus available from the base layer encoder (320) for further processing in the scalable encoding. If the input picture (305) was previously downsampled to either a lower bit depth or a lower chroma sampling rate by the downsampler (310), then the reconstructed version (335) is upsampled so that the reconstructed version (335) has the same bit depth and chroma sampling rate as the input picture (305). Alternatively, in addition to being output from the system (300), the encoded base layer bitstream (325) is also input to a decoder (not shown) to create the reconstructed version (335) of the input picture (305).

The steps of downsampling and encoding the input picture typically result in some loss of data between the original input picture (305) and the reconstructed version (335). For enhancement layer coding, the difference between the original input picture (305) and the reconstructed version (335) is generally referred to as the residual. A differentiator (340) subtracts samples of the reconstructed version (335) of the input picture from corresponding samples of the input picture (305) to produce this residual (345). One or both of the inputs to the differentiator (340) may be additionally filtered before the residual (345) is computed.

Generally, the residual (345) is encoded to form one or more enhancement layer bitstreams. In certain embodiments, the residual (345) is first decomposed by a decomposer (350). The decomposer (350) applies wavelet decomposition or some other suitable decomposition and downsampling methods to the residual (345) to form a chroma high-pass residual layer (360) and a sample depth residual layer (370). For example, if the residual (345) has 10-bit samples and a chroma sampling rate of 4:2:2, and the base layer had 8-bit samples and a chroma sampling rate of 4:2:0, the sample depth residual represents the sample depth differences between 8-bits and 10-bits, and the chroma high-pass residual represents the difference between 4:2:0 video and 4:2:2: video. In other embodiments, the residual (345) may already have a chroma sampling rate such that there is no need to decompose the residual using the decomposer (350) to create a separate chroma high-pass residual layer (360). For example, if the source video already has a chroma sampling rate of 4:2:0, then a chroma high-pass residual would be un-necessary because there would be no chroma difference to represent. Or, if the sample depth residual encoder (375) accepts higher resolution chroma, separation of the chroma high-pass residual can be skipped.

The chroma high-pass residual layer (360) is encoded by a chroma high-pass encoder (365), which outputs a chroma high-pass residual layer bitstream (380). For example, the chroma high-pass encoder (365) can encode according to a standard such as VC-1, MPEG-2, or H.264.

The sample depth residual layer (370) is mapped to a bit depth for encoding by the sample depth residual encoder (375). This mapping may be a relatively simple process of adding an offset and clipping to a certain range, or it can be a more complicated process involving a mapping from one range, such as 10-bits, to another range, such as 8-bits, through quantization or by mapping the first range to fit a specific distribution in the second range. In this way, even if the source video and sample depth residual layer have a sample depth (e.g., 10 bits) higher than the bit depth of samples accepted by the encoder (e.g., 8 bits), the enhancement layer still represents the difference between the lower sample depth base layer and the original sample depth of the input picture (305). In addition, mapping to a lower bit depth that is more conventional for video encoding makes more encoder implementations available for use as the sample depth residual encoder (375).

The sample depth residual layer (370) is then encoded by the sample depth residual encoder (375) as 8-bit samples. For example, the sample depth residual encoder (375) encodes the sample depth residual layer (370) according to a standard such as VC-1, MPEG-2, or H.264. The sample depth residual encoder (375) then outputs a sample depth residual layer bitstream (385).

The system (300) of FIG. 3 outputs a base layer bitstream (325), a chroma high-pass residual layer bitstream (380), and a sample depth residual layer bitstream (385). In other embodiments, an encoding system outputs only the chroma high-pass residual layer bitstream (380) or only the sample depth residual layer bitstream (385), for example, because the other residual layer is unnecessary or undesirable in the encoding scenario or decoding scenario. Alternatively, the system (300) outputs a single enhancement layer bitstream for both the chroma high-pass residual and sample depth residual.

To produce these various bitstreams, in some cases, the system (300) alters the bit depth and/or chroma sampling rate of the input picture (305) such that the system (300) can use an existing encoder to encode one or more of the layers and output the bitstreams. In some implementations, the system (300) uses the same encoder for all layers. In other implementations, the base layer encoder and enhancement layer encoder are different. The choice of enhancement layer encoder is not necessarily dependent upon the choice of base layer encoder.

In some implementations, the encoder for the base layer or the downsampled sample depth residual layer accepts 8-bit samples. Alternatively, the encoder accepts 10-bit samples, 12-bit samples, or samples with some other bit depth. The base layer or sample-depth residual layer encoder is typically operable to encode 4:2:0 video, but can instead encode 4:2:2 video, 4:4:4 video, or video having some other chroma sampling rate.

In certain implementations, motion compensation may be applied by at least one of the base layer encoder (320), the chroma high-pass encoder (365), and the sample depth residual encoder (375), and therefore any of these encoding processes may involve multi-loop encoding.

III. Scalable Chroma Sub-Sampling and Sample Depth in Decoding.

A. Generalized Techniques.

Bitstreams can become corrupted and therefore un-usable during transfer between an encoder and decoder. For many of the techniques and tools described herein, one advantage is that video can be reconstructed using only the base layer bitstream, both the base layer bitstream and the sample depth enhancement layer bitstream, both the base layer bitstream and the chroma high-pass enhancement layer bitstream, or all three of the base layer bitstream, sample depth enhancement layer bitstream, and chroma high-pass enhancement layer bitstream. Moreover, some video sources may not yield a chroma high-pass residual layer and/or sample depth residual layer. Nonetheless, video can be reconstructed using the base layer bitstream and the enhancement layer bitstream that is received.

Figure 4:
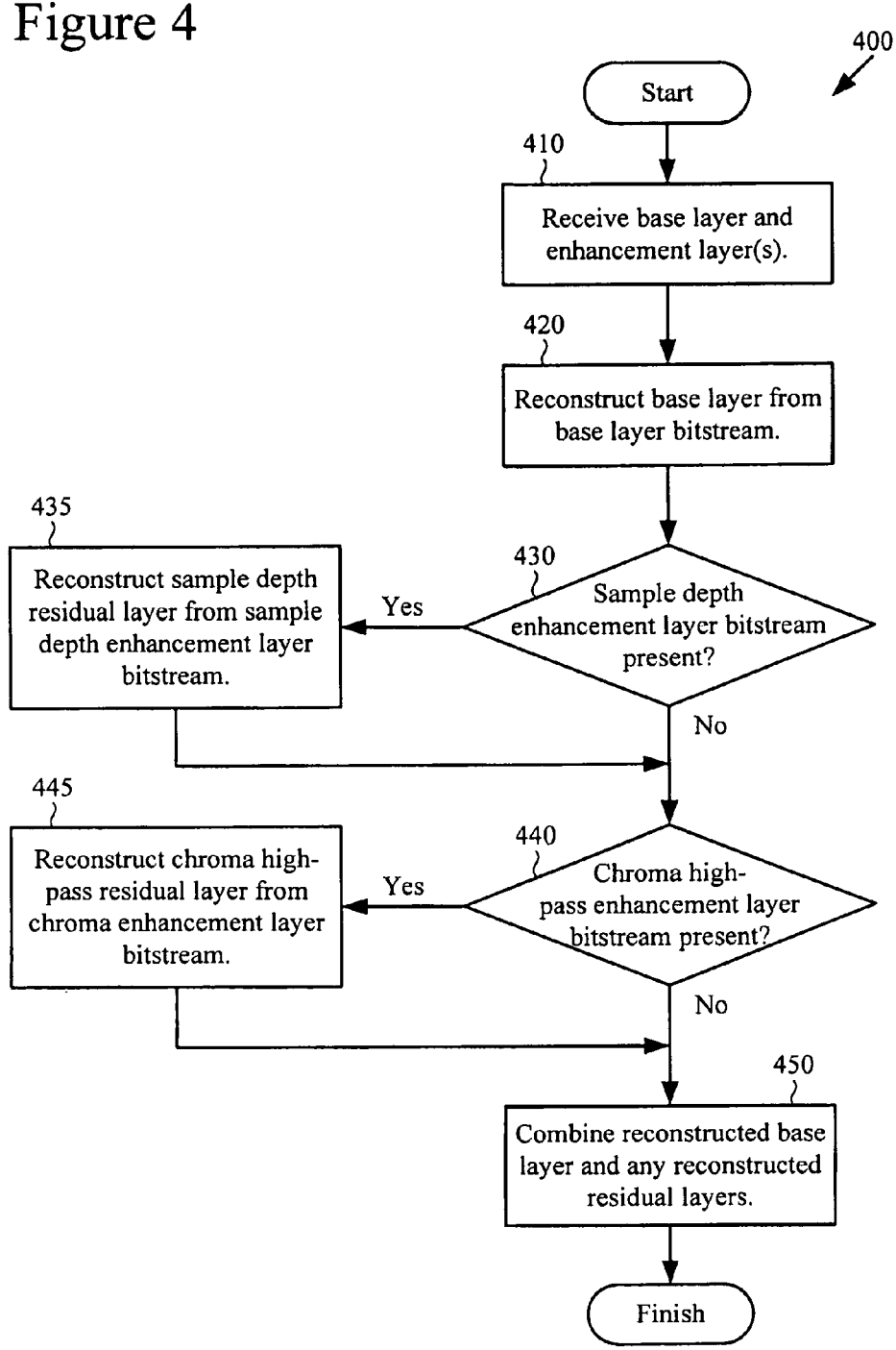
FIG. 4 is a flow chart of a generalized technique for decoding a video picture using a chroma high-pass residual layer and/or sample depth residual layer.

FIG. 4 shows a flow chart for a generalized technique (400) for decoding a video picture using, in addition to a base layer, a chroma high-pass residual layer and/or sample depth residual layer. A decoding system or other tool performs the technique (400), for example, to decode base layer and enhancement layer bitstreams that are output by the system (300) explained with reference to FIG. 3.

In the first step, the tool receives (410) the encoded base layer bitstream. The base layer bitstream can be encoded according to MPEG-2, VC-1, H.264, or some other standard. The tool may also receive (410) at least one of the chroma high-pass residual layer bitstream and the sample depth residual layer bitstream. The chroma high-pass residual layer bitstream and the sample depth residual layer bitstream may each have been encoded according to the same encoding standard as the base layer bitstream, or each may have been encoded according to a different standard.

The tool decodes the base layer bitstream and reconstructs (420) the base layer. For example, the tool uses MPEG-2 decoding, VC-1 decoding, H.264 decoding, or decoding according to some other decoding standard. If the base layer was downsampled (e.g., in terms of sample depth and/or chroma sampling rate), the decoder can perform upsampling as part of the reconstruction (420). For example, the decoder upsamples from a lower chroma resolution (e.g., 4:2:0 video) to a higher chroma resolution (e.g., 4:2:2 video) using sample value repetition, interpolation, or another upsampling mechanism to invert the downsampling from encoding. The decoder also upsamples from a lower sample depth (e.g., 8-bit samples) to a higher sample depth (e.g., 10-bit samples) using inverse tone mapping or another upsampling mechanism.

The tool then checks (430) to see if the sample depth enhancement layer bitstream is present. If it is, the tool decodes the sample depth enhancement layer bitstream and reconstructs (435) the sample depth residual layer. For example, the tool uses MPEG-2 decoding, VC-1 decoding, H.264 decoding, or decoding according to some other decoding standard. If the samples of the sample depth residual were mapped to a lower bit depth for encoding (e.g., from 10-bit samples to 8-bit samples), they are inverse mapped to the higher, original bit depth for the video.

Whether or not the sample depth enhancement layer was present, the tool determines (440) whether the chroma high-pass residual layer bitstream is present. If so, then the tool decodes the chroma enhancement layer bitstream and reconstructs (445) the chroma high-pass residual layer. For example, the tool uses MPEG-2 decoding, VC-1 decoding, H.264 decoding, or decoding according to some other decoding standard.

Finally, the tool combines (450) the reconstructed base layer and any of the reconstructed residual layers that are present. For example, after appropriate upsampling, if the base layer and an enhancement layer have the same bit depth and chroma sampling rate, and the layers are simply combined on a sample-by-sample basis. In some implementations, residual layers that were separated by wavelet decomposition are combined wavelet synthesis prior to combination with the reconstructed base layer.

The tool can perform the technique (400) on a picture-by-picture basis, video sequence-by-sequence basis, scene-by-scene basis or some other basis.

B. Example Decoding Tools.

Figure 5:
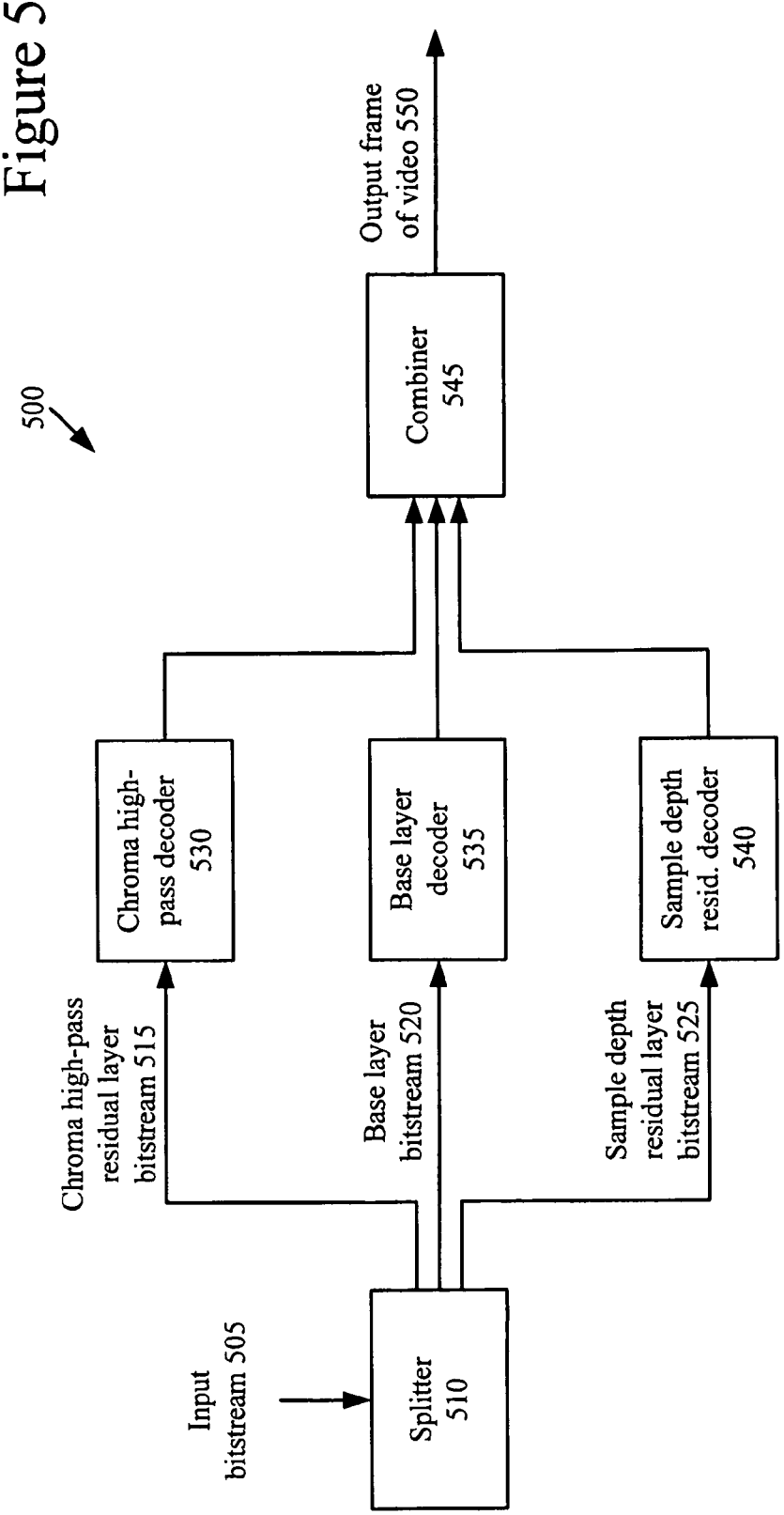
FIG. 5 is a block diagram of a video decoder system for decoding video encoded using scalable chroma sub-sampling and/or scalable sample depth.

FIG. 5 is a block diagram of a generalized video decoding system (500) in conjunction with which some described embodiments may be implemented. The system (500) receives an input bitstream (505) of compressed video information (including one or more bitstreams for different layers) and produces reconstructed video including an output frame (550).

The splitter (510) splits the input bitstream (505) into one or more of a chroma high-pass enhancement layer bitstream (515), the base layer bitstream (520) and the sample depth enhancement layer bitstream (525). For the base layer, the format of the bitstream can be a Windows Media Video or VC-1 format, MPEG-x format (e.g., MPEG-1, MPEG-2, or MPEG-4), H.26x format (e.g., H.261, H.262, H.263, or H.264), or other format. For the enhancement layer(s), the format of the bitstream(s) can be the same as the base layer bitstream or one of the other listed formats.

In some cases, the chroma high-pass enhancement layer bitstream (515) is not present in the input bitstream (505). This may happen if, for example, the source video has a chroma sampling rate (e.g., 4:2:0) that the base layer encoder (320) accepts, in which case there would be no need to represent the chroma sample difference between the original input pictures and the base layer. Or, even if encoding does produce the chroma high-pass enhancement layer bitstream (515), the bitstream (515) may be corrupted during transmission or on the storage media. Or, for some types of playback devices or some decoding scenarios, the chroma high-pass enhancement layer bitstream (515) can be selectively dropped by a transmitter or by the decoding system (500) so as to reduce bitrate or reduce decoding complexity.

In other cases, the sample depth residual layer bitstream (525) is not present in the input bitstream (505). This may happen if, for example, the source video has a sample bit depth (e.g., 8 bits per sample) that the base layer encoder accepts, in which case, the input pictures would not be downsampled before being encoded, and thus there would be no sample depth residual layer. Or, even if encoding does produce the sample depth enhancement layer bitstream (525), the bitstream (525) may be corrupted during transmission or on the storage media. Or, for some types of playback devices or some decoding scenarios, the sample depth enhancement layer bitstream (525) can be selectively dropped by a transmitter or by the decoding system (500) so as to reduce bitrate or reduce decoding complexity.

The base layer decoder (535) decodes the base layer bitstream (520) to produce a reconstructed base layer. If the base layer was downsampled (e.g., in terms of sample depth and/or chroma sampling rate), the system (500) upsamples the reconstructed base layer video. For example, to reverse chroma downsampling, the system (500) upsamples from a lower chroma resolution (e.g., 4:2:0 video) to a higher chroma resolution (e.g., 4:2:2 video or 4:4:4 video) using sample value repetition, fractional sample interpolation, or other upsampling mechanism. To reverse sample depth downsampling, the system (500) decoder upsamples from a lower sample depth (e.g., 8-bit samples) to a higher sample depth (e.g., 10-bit samples) using inverse tone mapping or another upsampling mechanism.

The chroma high-pass decoder (530) decodes the chroma high-pass enhancement layer bitstream (515) to produce a chroma high-pass residual layer. The chroma high-pass residual layer typically has the same chroma sampling rate as the source video, but if samples of the chroma high-pass residual layer were mapped to another representation before encoding, the system (500) reverses the mapping.

The sample depth residual decoder (545) decodes the sample depth enhancement layer bitstream (525) to produce a sample depth residual layer. In some implementations, the samples of the sample depth residual are mapped to a lower bit depth for encoding/decoding with an off-the-shelf codec. If so, the system (500) inverse maps the samples of the sample depth residual layer to the higher, original bit depth for the video.

The chroma high-pass residual layer, base layer, and sample depth residual layer are input to a combiner (545). If residual layers were separated by wavelet decomposition, the decoder (500) can combine the reconstructed residual layers using wavelet synthesis before combining the resultant residual layer with the reconstructed base layer. The combiner (545) combines the various layers to produce an output frame of video (550).

The chroma sampling rates and bit depths of the various layers at different stages of processing depend on implementation. Example source video formats have chroma sampling rates of 4:4:4, 4:2:2 or 4:2:0, and have bit depths that are 12 bits per sample, 10 bits per sample or 8 bits per sample. Typical base layer decoders work with 8-bit 4:2:0 video, but some base layer decoders also work with higher chroma sampling resolutions or higher bit depths, in which case the base layer has a format other than 4:2:0 with 8-bit samples. The enhancement layer decoders can operate on video at a higher sampling rate or bit depth. Alternatively, samples of the residual layer(s) can be mapped to a lower bit depth (e.g., 8 bits per sample) or chroma sampling resolution for conventional enhancement layer encoding/decoding tools, in which case the residual layer samples are restored to the higher resolution after decoding.

C. Reconstructing Base and Chroma High-Pass Residual Layers.

Figure 6:
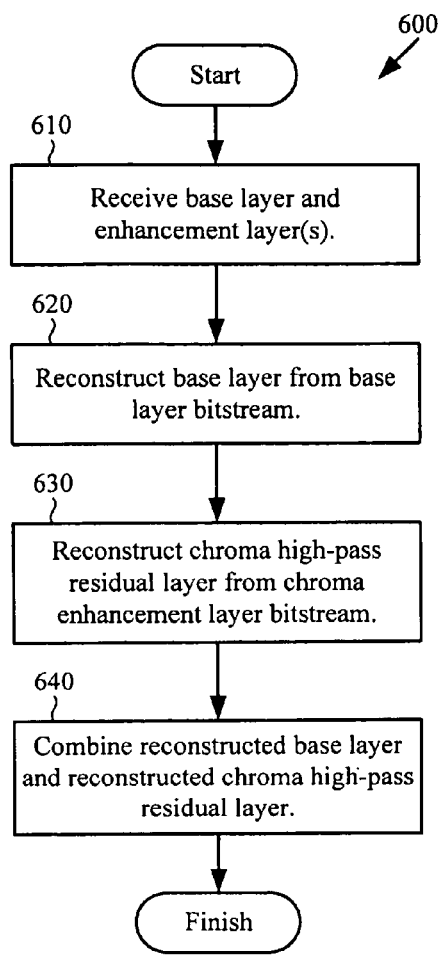
FIG. 6 is a flow chart of a generalized technique for decoding a base layer and a chroma high-pass residual layer of video.

FIG. 6 is a flowchart of a technique (600) for reconstructing video from a base layer bitstream and chroma high-pass enhancement layer bitstream. For example, a tool such as the decoding system (500) shown in FIG. 5 or other tool performs the technique (600).

The tool receives (610) the base layer bitstream and at least one enhancement layer bitstream. The tool reconstructs (620) the base layer from the base layer bitstream. For example, the reconstructed base layer provides 4:2:0 video with 8-bit samples. Additionally the tool reconstructs (630) the chroma high-pass residual layer from the chroma enhancement layer bitstream. For example, the chroma high-pass residual provides differences between 4:2:0 video and source 4:2:2 video. The reconstructed base layer and the reconstructed chroma high-pass residual layer are combined (640). The reconstructed video is, for example, 4:2:2 video (from the base layer and chroma high-pass residual layer) with 8-bit samples.

D. Reconstructing Base and Sample Depth Residual Layers.

Figure 7:
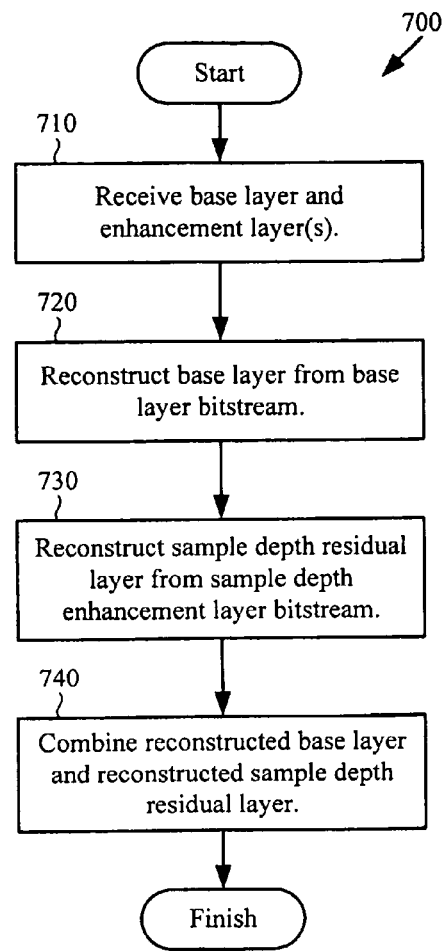
FIG. 7 is a flow chart of a generalized technique for decoding a base layer and a sample depth residual layer of video.

FIG. 7 is a flowchart of a technique (700) for reconstructing video from a base layer bitstream and sample depth enhancement layer bitstream. For example, a tool such as the decoding system (500) shown in FIG. 5 or other tool performs the technique (700).

The tool receives (710) the base layer bitstream and at least one enhancement layer bitstream. The tool reconstructs (720) the base layer from the base layer bitstream. For example, the reconstructed base layer provides 4:2:0 video with 8-bit samples. The tool also reconstructs (730) the sample depth residual layer from the sample depth enhancement layer bitstream. For example, the sample depth residual provides differences between 8-bit samples and 10-bit samples. The tool combines (740) the reconstructed base layer and the reconstructed sample depth residual layer. The reconstructed video is, for example, 4:2:0 video with 10-bit samples (from the base layer and chroma high-pass residual layer).

The techniques (600, 700) of FIGS. 6 and 7 illustrate practical advantages of using separate sample depth enhancement layer and chroma high-pass enhancement layer bitstreams according to some implementations. Even if one of the enhancement layer bitstreams is corrupted, dropped or otherwise lost, a substantial portion of the original video can still be decoded and recovered from the base layer and the enhancement layer bitstream that is received.

Another advantage in some implementations is that off-the-shelf codecs that accept lower sample depth video can be used process sample depth residuals. This is accomplished by mapping bit depth residuals from a higher bit depth (e.g., 12 bits per sample, 10 bits per sample) to a lower bit depth (e.g., 8 bits per sample) before encoding, and performing the inverse mapping after decoding.

Yet another advantage is that, in certain implementations, each of the base layer, the sample depth enhancement layer, and the chroma high-pass enhancement layer can be decoded independently from each other and then can be combined after the decoding step. For example, the base layer and each of the enhancement layers could be separately decoded by the tool described with reference to FIGS. 6 and 7, and then output from the tool without being combined. This could be desirable if a highly efficient separate combining process or tool was available to combine the base layer and the enhancement layers as part of post-processing. The lack of decoding dependencies between the base layer, sample depth enhancement layer and chroma high-pass enhancement layer can also simplify implementation for decoding systems that use different processors for the respective layers.

Having described and illustrated the principles of our invention with reference to various embodiments, it will be recognized that the various embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of embodiments shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method of encoding video comprising:
    encoding base layer video to produce at least part of a base layer bitstream;
    determining chroma high-pass residual layer video and sample depth residual layer video from input video and a reconstructed version of the base layer video;
    remapping samples of the sample depth residual layer video from a first range to a second range;
    encoding the chroma high-pass residual layer video to produce at least part of a chroma enhancement layer bitstream;
    encoding the remapped samples of the sample depth residual layer video to produce at least part of a sample depth enhancement layer bitstream; and
    outputting the at least part of the base layer bitstream, the at least part of the chroma enhancement layer bitstream, and the at least part of the sample depth enhancement layer bitstream.

2. The method of claim 1 further comprising:
    before the encoding the base layer video, producing the base layer video from the input video; and
    reconstructing the base layer video.

3. The method of claim 2 wherein each of the base layer video, the chroma high-pass residual layer video, the sample depth residual layer video and the reconstructed version of the base layer video includes one or more pictures, and wherein:
    the input video has a first bit depth and a first chroma sub-sampling rate;
    the producing the base layer video comprises downsampling the input video to a second bit depth and a second chroma sub-sampling rate; and
    the reconstructing the base layer video comprises upsampling to the first bit depth and the first chroma sub-sampling rate.

4. The method of claim 3 wherein downsampling comprises at least one of tone mapping and chroma down-sampling, and wherein the upsampling comprises at least one of chroma upsampling and inverse tone mapping.

5. The method of claim 3 wherein the downsampling comprises tone mapping, and wherein the upsampling comprises inverse tone mapping.

6. The method of claim 1 wherein the encoding the base layer video and the encoding the remapped samples of the sample depth residual layer video use different encoders.

7. The method of claim 1 wherein the encoding the base layer video and the encoding the remapped samples of the sample depth residual layer video use the same encoder.

8. The method of claim 1 wherein the encoding the chroma high-pass residual layer video comprises encoding the chroma high-pass residual layer video with a chroma high-pass encoder.

9. The method of claim 1 wherein the determining chroma high-pass residual layer video and sample depth residual layer video comprises:
producing overall residual layer video from the input video and the reconstructed version of the base layer video; and
decomposing the overall residual layer video into the chroma high-pass residual layer video and the sample depth residual layer video.

10. The method of claim 9 wherein the step of decomposing the overall residual comprises wavelet decomposition.

11. The method of claim 1 wherein at least one of the encoding the chroma high-pass residual layer video and the encoding the remapped samples of the sample depth residual layer video includes performing motion compensation.

12. A method comprising:
receiving at least part of a base layer bitstream, at least part of a chroma enhancement layer bitstream, and at least part of a sample depth enhancement layer bitstream;
decoding the at least part of the base layer bitstream to produce base layer video;
upsampling samples of the base layer video from a first chroma sub-sampling rate to a second chroma sub-sampling rate using fractional sample interpolation;
decoding the at least part of the chroma enhancement layer bitstream to produce chroma high-pass residual layer video;
decoding the at least part of the sample depth enhancement layer bitstream to produce sample depth residual layer video;
remapping decoded samples of the sample depth residual layer video from a first range to a second range; and
combining the base layer video, the sample depth enhancement layer video, and the chroma high-pass residual layer video.

13. The method of claim 12 further comprising:
composing the chroma high-pass residual layer video with one or more other residual layers of video prior to the combining, the one or more other residual layers of video including the sample depth enhancement layer video, wherein the composing comprises wavelet synthesis.

14. The method of claim 12 further comprising:
on a picture-by-picture basis, combining the sample depth residual layer video with the base layer video and the chroma high-pass residual layer video.

15. The method of claim 14 wherein a different decoding loop includes each of the decoding the at least part of the base layer bitstream, the decoding the at least part of the chroma enhancement layer bitstream, and the decoding the at least part of the sample depth enhancement layer bitstream, wherein the decoding loops are independent of each other, and wherein the combining the sample depth residual layer video with the base layer video and the chroma high-pass residual layer video occurs as part of post-processing after and outside of the decoding loops.

16. The method of claim 12 further comprising, prior to the combining, remapping decoded samples of the chroma high-pass residual layer video to another representation.

17. A method comprising:
receiving at least part of a base layer bitstream and at least part of a sample depth enhancement layer bitstream;
decoding the at least part of the base layer bitstream to produce base layer video;
decoding the at least part of the sample depth enhancement layer bitstream to produce sample depth residual layer video;
remapping decoded samples of the sample depth residual layer video from a first range to a second range; and
combining the base layer video and the sample depth residual layer video.

18. The method of claim 17 wherein the base layer video has a first bit depth, the method further comprising:
upsampling decoded samples of the base layer video from the first bit depth to a second bit depth higher than the first bit depth.

19. The method of claim 18 wherein the upsampling the decoded samples of the base layer video to the second bit depth includes inverse tone mapping.

20. A computing system adapted to perform a method of video decoding, the computing system including memory and a processor, the method comprising:
receiving at least part of a base layer bitstream and at least part of a sample depth enhancement layer bitstream;
decoding the at least part of the base layer bitstream to produce base layer video;
decoding the at least part of the sample depth enhancement layer bitstream to produce sample depth residual layer video;
remapping decoded samples of the sample depth residual layer video from a first range to a second range; and
combining the base layer video and the sample depth residual layer video.

* * * * *